(12) United States Patent
Sheu et al.

(10) Patent No.: US 11,381,129 B2
(45) Date of Patent: Jul. 5, 2022

(54) MOTOR STATOR WITH WINDING CONFIGURATION USING HAIRPIN WIRES

(71) Applicant: DELTA ELECTRONICS, INC., Taoyuan (TW)

(72) Inventors: Hong-Cheng Sheu, Taoyuan (TW); Chun-Chih Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 303 days.

(21) Appl. No.: 16/701,173

(22) Filed: Dec. 3, 2019

(65) Prior Publication Data

US 2020/0212750 A1 Jul. 2, 2020

Related U.S. Application Data

(60) Provisional application No. 62/785,704, filed on Dec. 28, 2018.

(30) Foreign Application Priority Data

Jun. 12, 2019 (CN) .......................... 201910504040.2

(51) Int. Cl.
| | |
|---|---|
| *H02K 3/42* | (2006.01) |
| *H02K 1/16* | (2006.01) |
| *H02K 3/14* | (2006.01) |
| *H02K 3/28* | (2006.01) |

(52) U.S. Cl.
CPC .................. *H02K 3/42* (2013.01); *H02K 1/16* (2013.01); *H02K 3/14* (2013.01); *H02K 3/28* (2013.01)

(58) Field of Classification Search
CPC .. H02K 3/42; H02K 1/16; H02K 3/14; H02K 3/28; H02K 3/12
See application file for complete search history.

(56) References Cited

U.S. PATENT DOCUMENTS

| | | | |
|---|---|---|---|
| 6,181,043 B1 * | 1/2001 | Kusase | ..................... H02K 3/12 310/180 |
| 6,469,413 B1 * | 10/2002 | Oohashi | ................. H02K 11/05 310/184 |
| 6,894,417 B2 | 5/2005 | Cai et al. | |

(Continued)

FOREIGN PATENT DOCUMENTS

| | | |
|---|---|---|
| CN | 107615621 A | 1/2018 |
| CN | 207304180 U | 5/2018 |

(Continued)

*Primary Examiner* — Tulsidas C Patel
*Assistant Examiner* — Viswanathan Subramanian
(74) *Attorney, Agent, or Firm* — CKC & Partners Co., LLC

(57) ABSTRACT

A motor stator has a core and first, second and third hairpin wires. The core has slots, an insertion side and an extension side. Each first hairpin wire has its first hairpin first leg inserted into a third layer of the slots and its first hairpin second leg inserted into a sixth layer of the slots. Each second hairpin wire has its second hairpin first leg inserted into a fourth layer of the slots and its second hairpin second leg inserted into a fifth layer of the slots. Each third hairpin wire has its third hairpin first leg inserted into a first layer of the slots and its third hairpin second leg inserted into a second layer of the slots. At the extension side, a plurality of immediately-adjacent hairpin legs are connected to form first and second winding sets.

20 Claims, 16 Drawing Sheets

(56) References Cited

U.S. PATENT DOCUMENTS

| | | | |
|---|---|---|---|
| 2003/0230949 A1* | 12/2003 | Ogawa | H02K 3/505 |
| | | | 310/180 |
| 2005/0258703 A1* | 11/2005 | Kouda | H02K 3/12 |
| | | | 310/180 |
| 2006/0033394 A1 | 2/2006 | Ogawa et al. | |
| 2012/0025660 A1 | 2/2012 | Patel et al. | |
| 2013/0009509 A1 | 1/2013 | Tsuge et al. | |
| 2014/0077636 A1* | 3/2014 | Jung | H02K 3/28 |
| | | | 310/71 |
| 2017/0133968 A1* | 5/2017 | Takahashi | H02K 3/50 |
| 2018/0152067 A1 | 5/2018 | Gotz et al. | |
| 2018/0152068 A1* | 5/2018 | Gotz | H02K 3/48 |
| 2018/0152070 A1* | 5/2018 | Sheu | H02K 3/28 |
| 2018/0294686 A1* | 10/2018 | Sawada | H02K 3/04 |

FOREIGN PATENT DOCUMENTS

| | | |
|---|---|---|
| CN | 108123563 A | 6/2018 |
| EP | 1381140 A2 | 1/2004 |
| JP | 2005-341656 A | 12/2005 |
| JP | 2018-93714 A | 6/2018 |
| TW | I622249 B | 4/2018 |

\* cited by examiner

MOTOR STATOR WITH WINDING CONFIGURATION USING HAIRPIN WIRES

CROSS-REFERENCE TO RELATED APPLICATION

This application claims priority to China Application Serial Number 201910504040.2, filed Jun. 12, 2019 and U.S. Provisional Application Ser. No. 62/785,704, filed Dec. 28, 2018, which are herein incorporated by reference in their entirety.

BACKGROUND

Field of Invention

The present disclosure relates to a motor stator, and more particularly to a motor stator including hairpin wires.

Description of Related Art

On stators used in electric motors, the wires wound around receiving slots of an iron core typically require a sufficient cross-sectional area to conduct large currents due to low voltage applications or high power requirements.

A single copper wire with a large cross section has the advantage of a higher slot occupying ratio, but an AC loss of the large cross-sectional copper wire may rise rapidly along with the motor's increasing speed due to the skin effect and the proximity effect.

SUMMARY

In one or more embodiments, a motor stator comprises a core and a plurality of first, second and third hairpin wires. The core comprises a plurality of slots, an insertion side and an extension side opposite to the insertion side, wherein each slot comprises a first layer, a second layer, a third layer, a fourth layer, a fifth layer and a sixth layer, configured from outer to inner in a radial direction of the core. Each first hairpin wire comprises a first hairpin first leg and a first hairpin second leg, wherein each first hairpin first leg is inserted into the third layer of the slots from the insertion side and protruded out of the slots from the extension side and bent in a first direction, wherein each first hairpin second leg is inserted into the sixth layer of the slots from the insertion side and protruded out of the slots from the extension side and bent in a second direction. Each second hairpin wire comprises a second hairpin first leg and a second hairpin second leg, wherein each second hairpin first leg is inserted into the fourth layer of the slots from the insertion side and protruded out of the slots from the extension side and bent in a third direction, wherein each second hairpin second leg is inserted into the fifth layer of the slots from the insertion side and protruded out of the slots from the extension side and bent in a fourth direction. Each third hairpin wire comprises a third hairpin first leg and a third hairpin second leg, wherein each third hairpin first leg is inserted into the first layer of the slots and each third hairpin second leg is inserted into the second layer of the slots. Each first hairpin first leg is connected with the immediately-adjacent first hairpin second leg, second hairpin first leg and second hairpin second leg to form a first winding set.

In one or more embodiments, a motor stator comprises a core and a plurality of first, second and third hairpin wires. The core comprises a plurality of slots, an insertion side and an extension side opposite to the insertion side, wherein each slot comprises a first layer, a second layer, a third layer, a fourth layer, a fifth layer and a sixth layer, configured from outer to inner in a radial direction of the core. Each first hairpin wire comprises a first hairpin first leg and a first hairpin second leg, wherein each first hairpin first leg is inserted into the third layer of the slots, wherein each first hairpin second leg is inserted into the sixth layer of the slots. Each second hairpin wire comprises a second hairpin first leg and a second hairpin second leg, wherein each second hairpin first leg is inserted into the fourth layer of the slots, wherein each second hairpin second leg is inserted into the fifth layer of the slots. Each third hairpin wire comprises a third hairpin first leg and a third hairpin second leg, wherein each third hairpin first leg is inserted into the first layer of the slots and each third hairpin second leg is inserted into the second layer of the slots. At the extension side, a plurality of immediately-adjacent hairpin legs are connected such that the first hairpin first leg the first hairpin second leg, the second hairpin first leg and the second hairpin second leg are connected to form a first winding set, and the third hairpin first leg and the third hairpin second leg are connected to form a second winding set.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
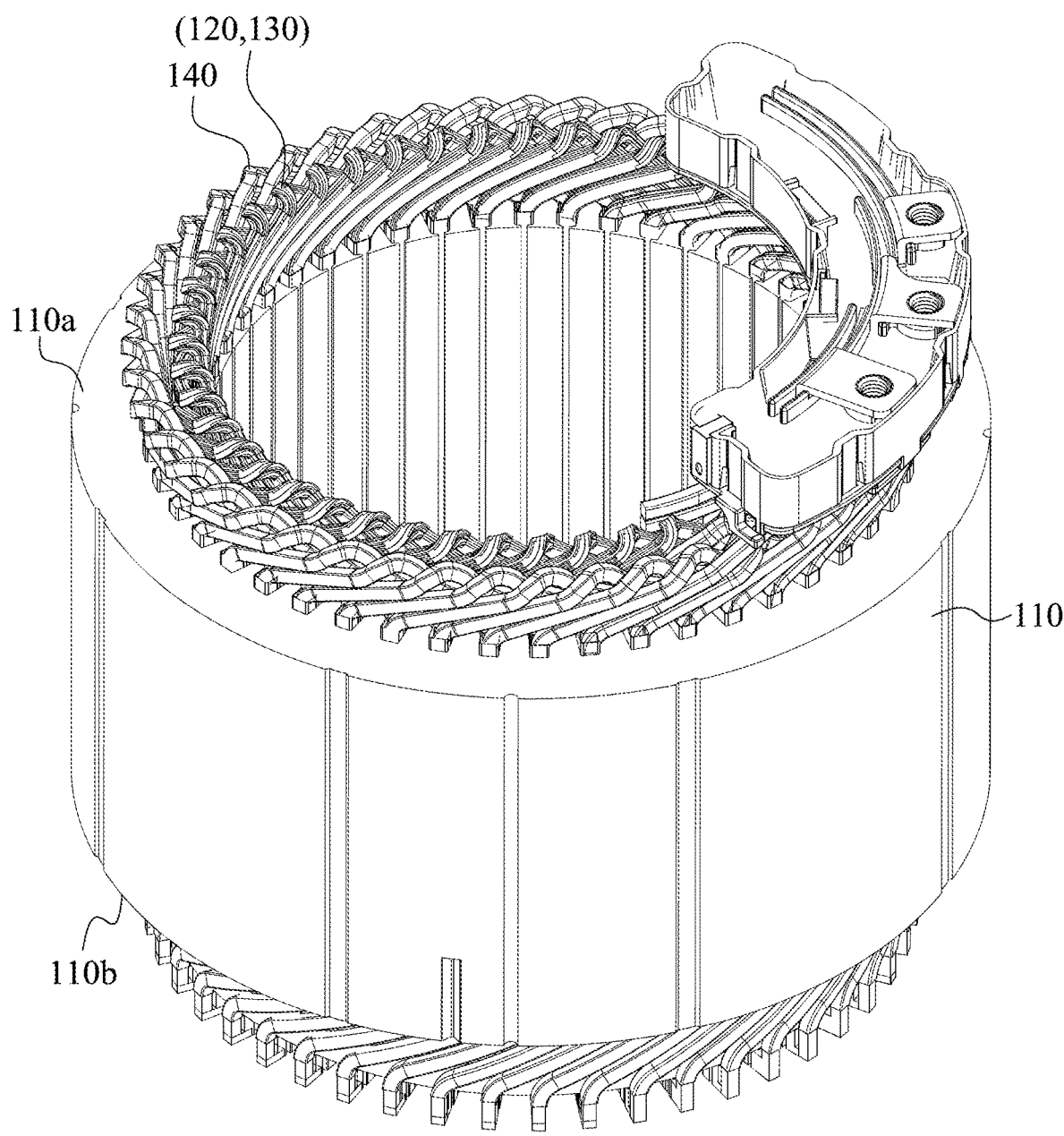
FIG. 1 illustrates a perspective view of a motor stator from a first viewpoint according to an embodiment of the present disclosure.

Reference will now be made in detail to the present embodiments, examples of which are illustrated in the accompanying drawings. Wherever possible, the same reference numbers are used in the drawings and the description to refer to the same or like parts.

Figure 2:
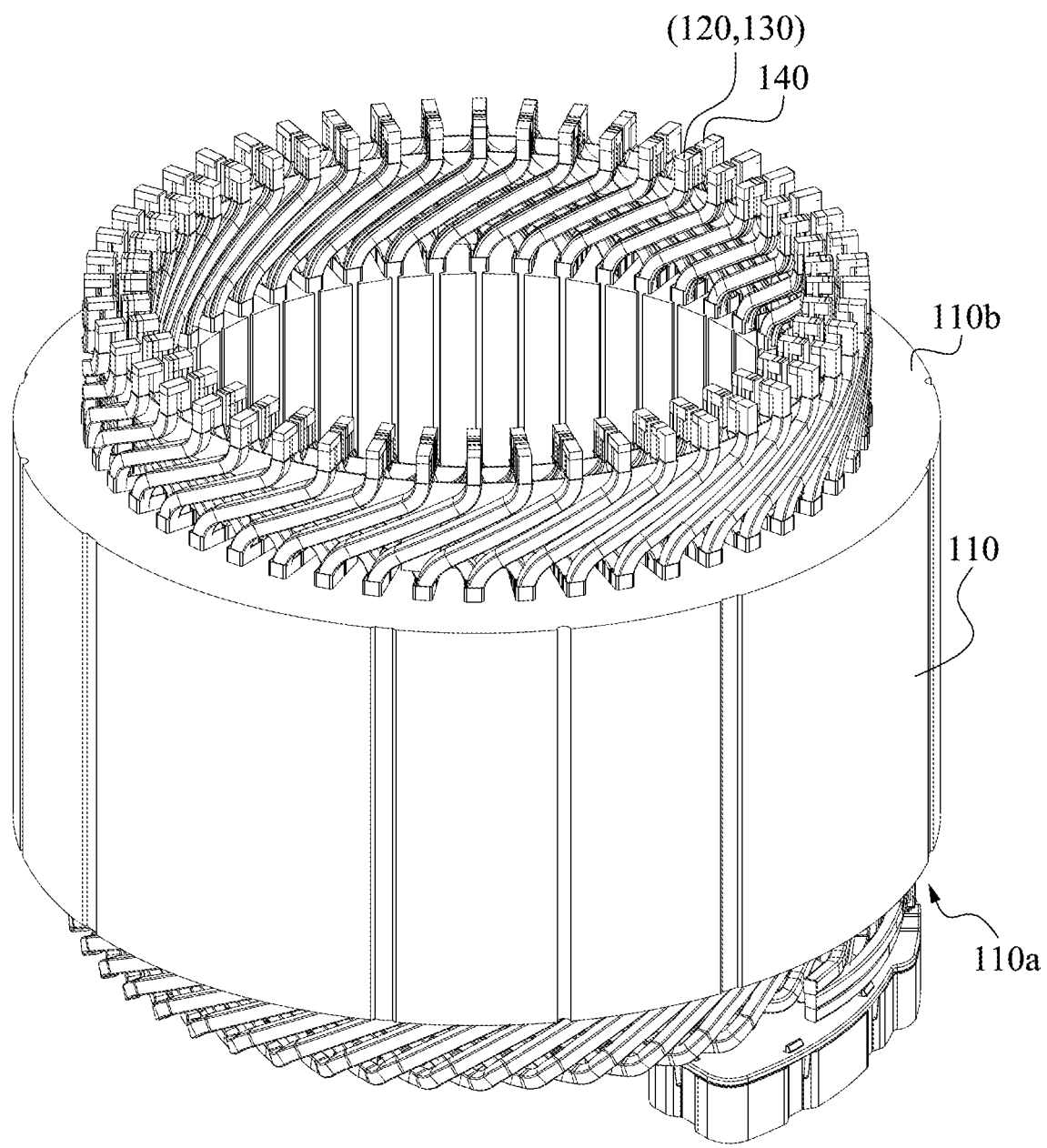
FIG. 2 illustrates a perspective view of a motor stator from a second viewpoint according to an embodiment of the present disclosure.
Figure 3:
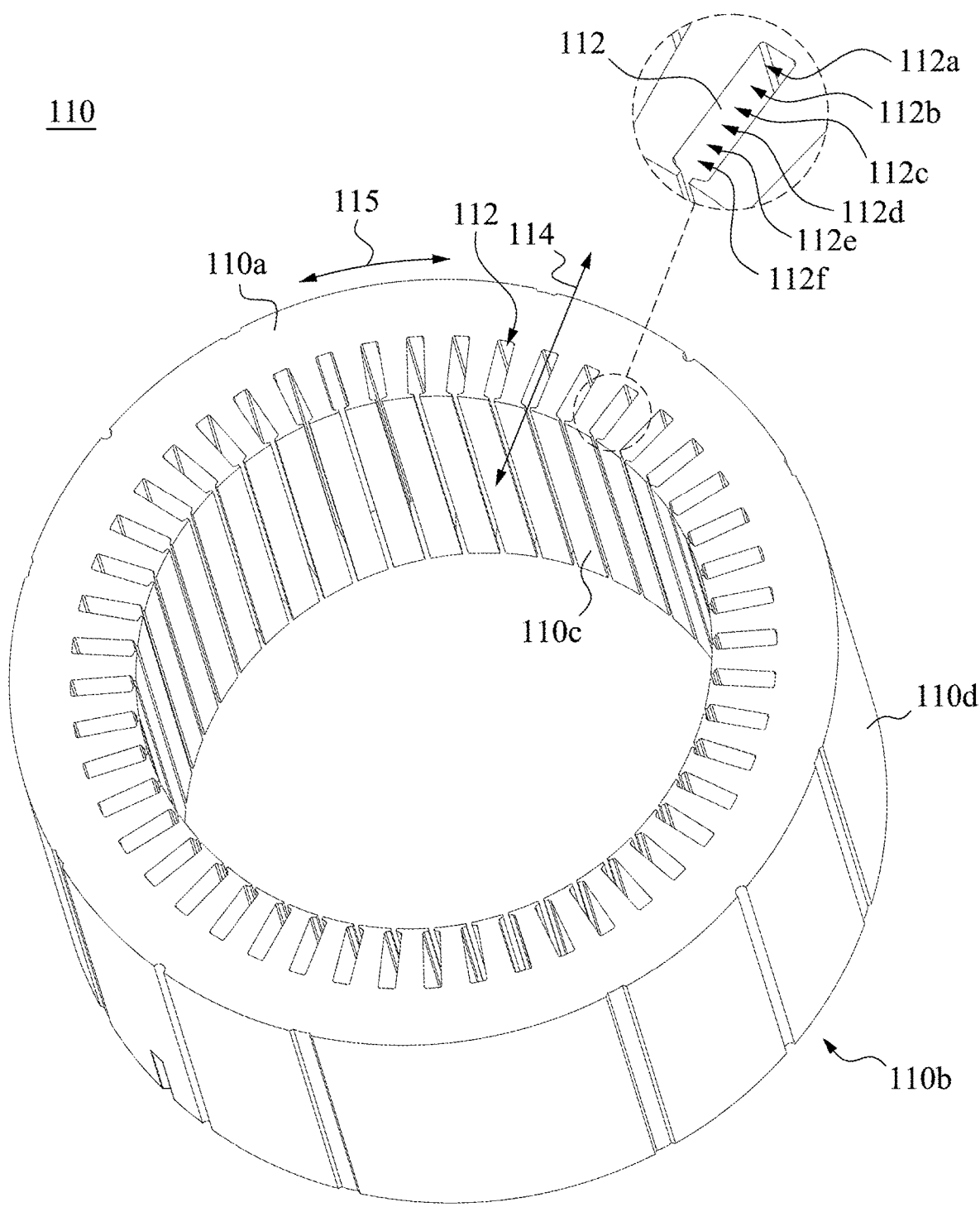
FIG. 3 illustrates a perspective view of an iron core of a motor stator according to an embodiment of the present disclosure.

Reference is made to FIGS. 1-3. A motor stator 100 includes an iron core 110 and a plurality of hairpin wires (e.g., hairpin wires 120, 130, 140) inserted thereon. The iron core 110 has a plurality of slots 112 to be inserted by the hairpin wires that are configured to be connected. The number of slots 112 can be 48, 60 or 120, but not being limited thereto. The number of slots can be configured according to the design requirements of the motor stator. Within the limits of the design specifications, configuring an iron core with more slots may result in a denser wire configuration, which makes the gap between the wires closer. Accordingly, the number of slots, the number of slot layers, the hairpin wire span distance, and the manner of which connections are made, are factors that should be considered in the design of the motor stator. Shown in the figures, the iron core 110 has an insertion side 110a and an extension side 110b opposite to the insertion side. That is, the insertion side 110a and the extension side 110b are at opposite sides of the iron core 110. Each slot 112 is configured, with respect to the radial direction 114 of the iron core 110 (e.g., from an outer side 110d to an inner side 110c of the iron core), with a first layer 112a, a second layer 112b, a third layer 112c, a fourth layer 112d, a fifth layer 112e, and a sixth layer 112f. Note, for reference, the radial direction 114 of the iron core 110 is substantially perpendicular to a circumferential direction 115 of the iron core 110.

In this embodiment, two legs of the hairpin wires 140 are respectively inserted into the first layer 112a and the second layer 112b of the slots 112. The hairpin wires (120, 130) are inserted into the third to sixth layers (112c to 112f) of the slots 112. At the extension side 110b of the iron core 110, the immediately-adjacent legs of the hairpin wires 140 are protruded out of the first and second layers 112a, 112b of the slots 112 and connected to form a winding. The immediately adjacent legs of the hairpin wires (120, 130) are protruded out of the third to sixth layers (112c to 112f) and connected to form another winding. That is, the windings formed by the plurality of hairpin wires (120, 130) are connected to each other, which will be described later in detail.

In this embodiment, each slot can accommodate six layers of wires as an example, but the number of wire accommodating layers per slot is not limited thereto.

Figure 4:
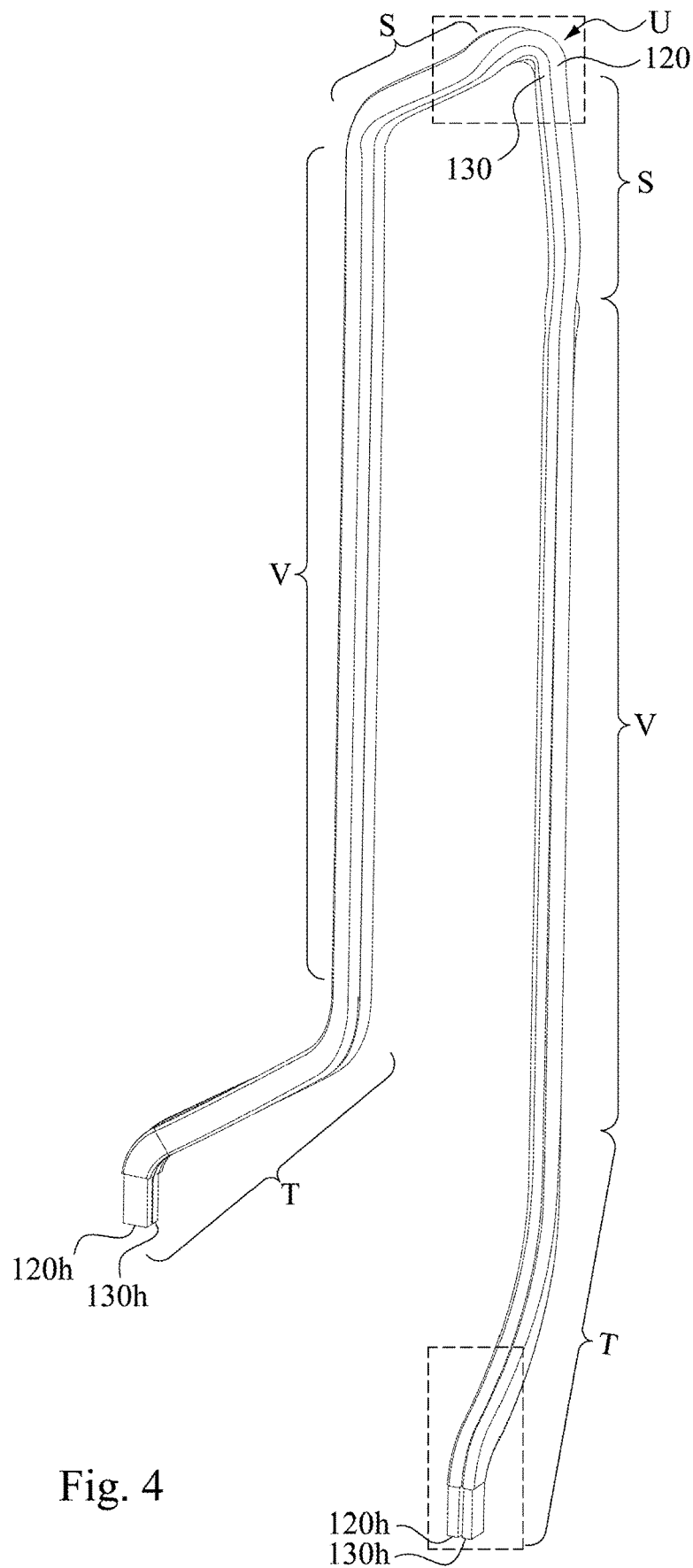
FIG. 4 illustrates a perspective view of a hairpin wire according to an embodiment of the present disclosure.
Figure 5:
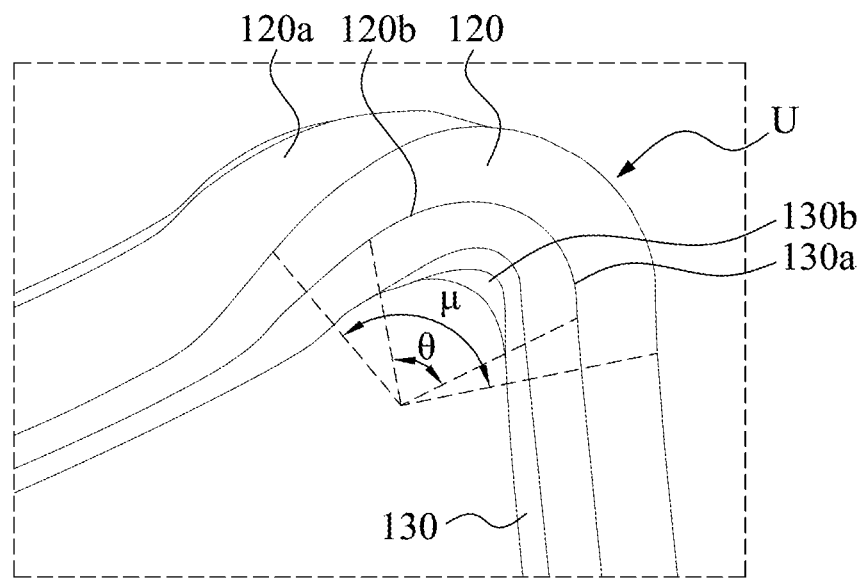
FIG. 5 illustrates an enlarged view of a U-turn section of the hairpin wire in FIG. 4.
Figure 6:
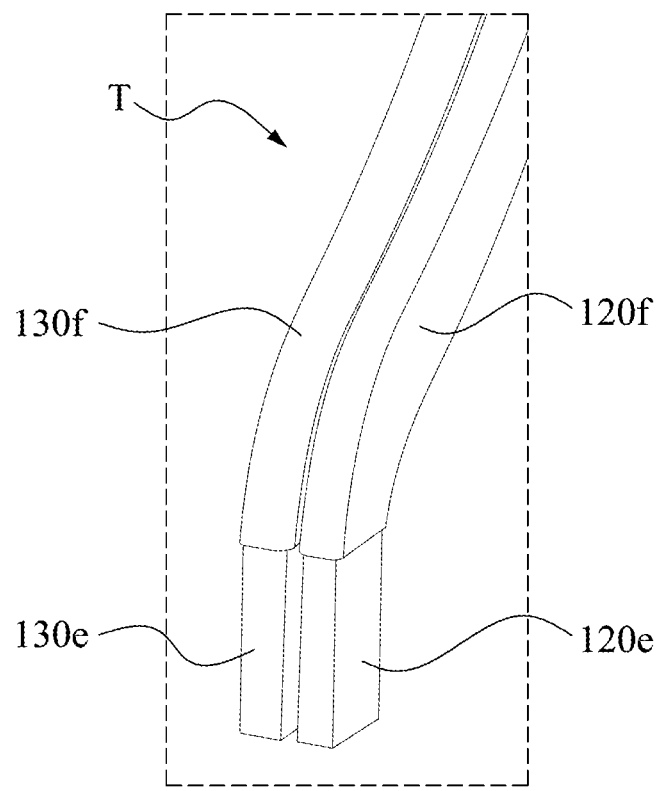
FIG. 6 illustrates an enlarged view of an end portion of a leg of the hairpin wire in FIG. 4.

Reference is made to FIGS. 4-6. In FIG. 4, the hairpin wires (120, 130) include the hairpin wire 120 imposed on the outside of the hairpin wire 130, and are inserted into the iron core 110. Each of the hairpin wires 120 or 130 includes a U-turn section U and two legs, and the two legs extend from the sides of the U-turn section U. Each leg further includes an inclined section S, a longitudinal section V, and a foot section T. When each hairpin wire is inserted into the slots of the iron core 110, the longitudinal section V is located within the slots 112 of the iron core 110, the inclined section S is exposed at the insertion side 110a of the iron core 110, and the foot section T is exposed at the extension side 110b of the iron core 110.

In FIG. 5, the hairpin wire 120 has opposite surface 120a and surface 120b. The hairpin wire 130 has opposite surface 130a and surface 130b. The hairpin wire 120 is imposed on an outer surface of the hairpin wire 130, i.e., the surface 120b of the hairpin wire 120 partially or completely contacts the surface 130a of the hairpin wire 130.

As shown in FIG. 6, each hairpin wire 120, 130 has an insulation coating, for example, the hairpin wire 120 is coated with an insulation coating 120f, and the hairpin wire 130 is coated with an insulation coating 130f. The ends of the two legs of each hairpin wire are exposed from the insulation coating such that the two legs can be electrically connected to each other. For example, the end 120e of the leg of the hairpin wire 120 is exposed from the insulation coating 120f, and the end 130e of the leg of the hairpin wire 130 is exposed from the insulation coating 130f, such that the ends (120e, 130e) can be welded to form an electrical connection. Each hairpin wire 120 or 130 may be coated with the insulation coating except for the ends of the two legs. For example, the aforementioned surfaces 120a, 120b, 130a, 130b may be the surfaces of the insulation coating, and a contact between the surface 120b and the surface 130a is the contact between the surfaces of the insulation coating.

Referring to FIG. 4, showing that the hairpin wires 120 are imposed to an outer side of the hairpin wires 130, and the end surfaces 120h of two opposite legs of the hairpin wires 120 are respectively flush with the end surfaces 130h of two opposite legs of the hairpin wires 130. A total length of the hairpin wire 120 is substantially greater than a total length of the hairpin wire 130, but not being limited thereto.

Referring to FIG. 5, both the hairpin wire 120 and its imposed hairpin wire 130 have a U-turn section U, and a bent angle of the hairpin wire 120 at the U-turn section U is different from that of the hairpin wire 130. Specifically, a turning angle $\mu$ of the hairpin wires 120 at the U-turn section U is greater than a turning angle $\theta$ of the hairpin wire 130 at the U-turn section U.

Figure 7A:
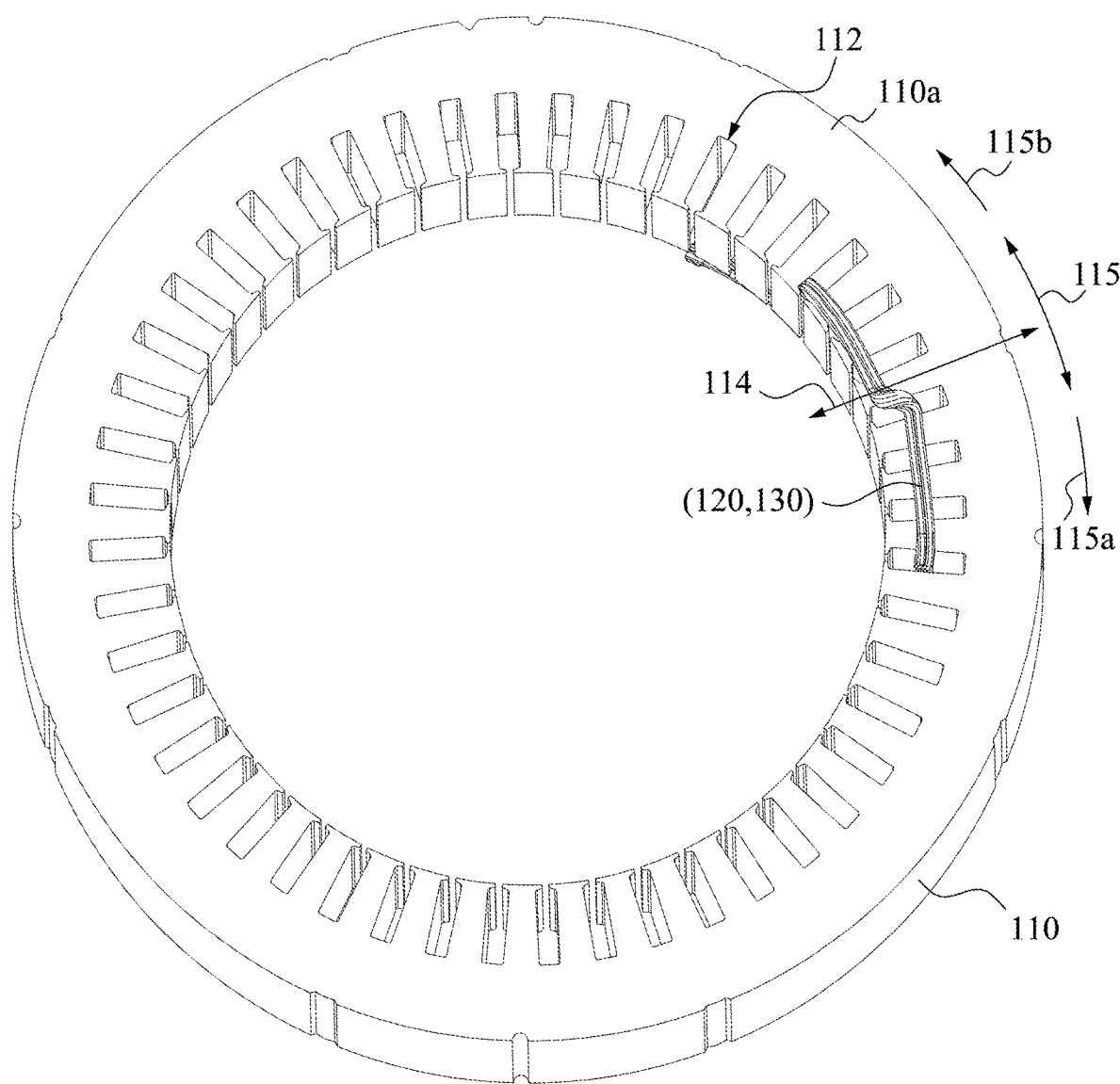
FIG. 7A illustrates a perspective view of a hairpin wire inserted into the iron core from the insertion side according to an embodiment of the present disclosure.
Figure 7B:
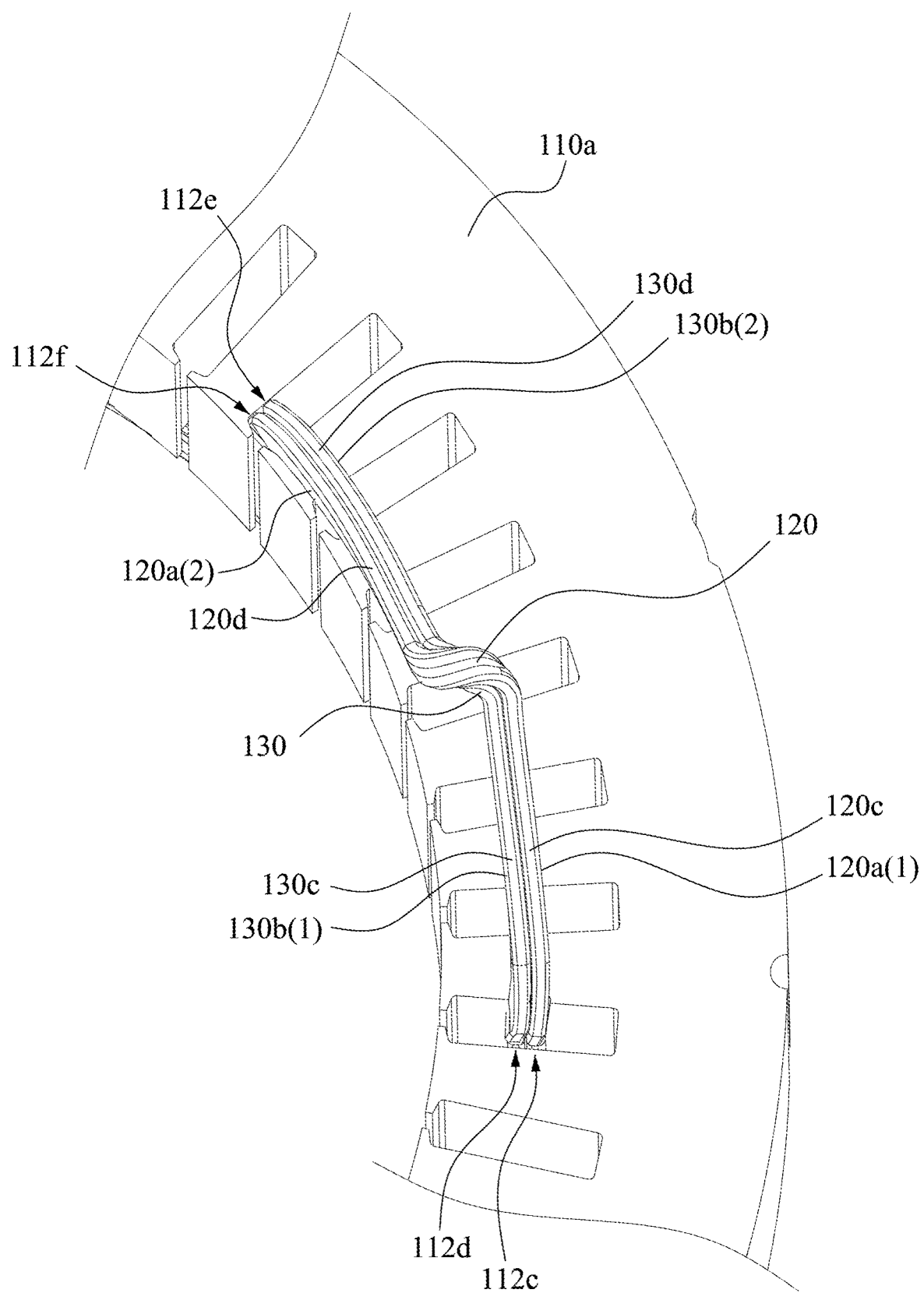
FIG. 7B illustrates an enlarged view of a section illustrated in FIG. 7A.
Figure 7C:
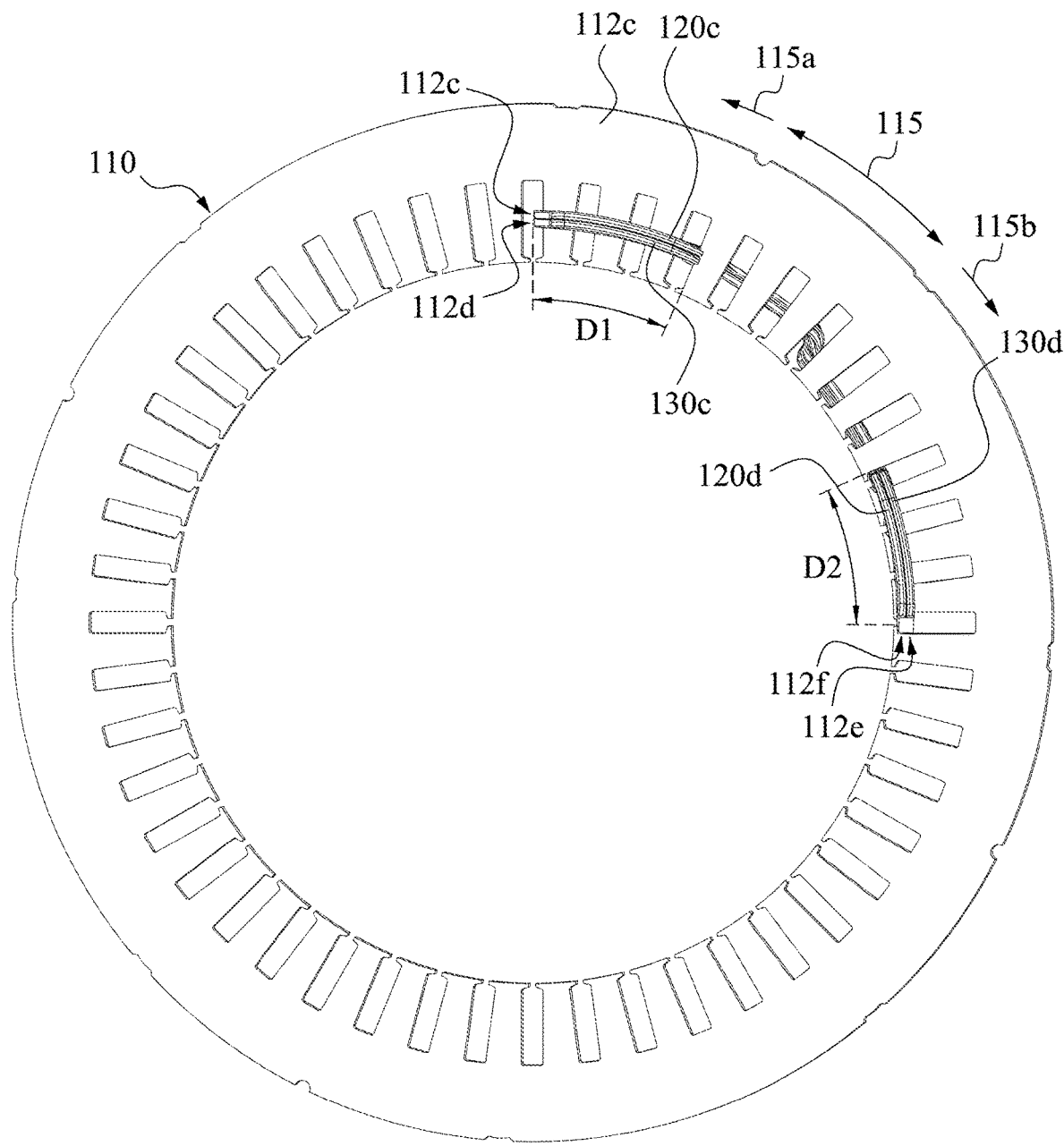
FIG. 7C illustrates a perspective view of the hairpin wire in FIG. 7A from the extension side viewpoint.

Reference is made to FIGS. 7A, 7B and 7C. As shown, the third to sixth layers 112c-112f of the slots 112 of the iron core 110 are configured to be inserted by the hairpin wires 120, 130. To more clearly illustrate the positional relationship of each of the hairpin wires 120, 130 and slots 112 of the iron core 110, only one of the hairpin wires 120, 130 is illustrated. Each hairpin wire 120 is imposed to an outer side of a corresponding hairpin wire 130.

Each hairpin wire 120 has two legs 120c, 120d. The leg 120c of each hairpin wire 120 is inserted into the third layer 112c of the slots 112 from the insertion side 110a of the iron core 110, and protruded out of the third layer 112c of the slots 112 from the extension side 110b of the iron core 110, and bent in the direction 115a, and extended over a span distance D1. The other leg 120d of each hairpin wire 120 is inserted into the sixth layer 112f of the slots 112 from the insertion side 110a of the iron core 110, and protruded out of the sixth layer 112f of the slots 112 from the extension side 110b of the iron core 110, and bent in the direction 115b, and extended over a span distance D2. The span distance D1 is substantially the same as the span distance D2. Note that the for reference direction 115a and the direction 115b are opposite circumferential directions 115.

Each hairpin wire 130 has two legs 130c, 130d. The leg 130c of each hairpin wire 130 is inserted into the fourth layer 112d of the slots 112 from the insertion side 110a of the iron core 110, and protruded out of the fourth layer 112d of the slots 112 from the extension side 110b of the iron core 110, and bent in the direction 115a, and extended over a span distance D1. The other leg 130d of each hairpin wire 130 is inserted into the fifth layer 112e of the slots 112 from the insertion side 110a of the iron core 110, and protruded out of the fifth layer 112e of the slots 112 from the extension side 110b of the iron core 110, and bent in the direction 115b, and extended over a span distance D2.

As shown in FIGS. 3, 4 and 7B, at the insertion side 110a of the iron core 110, the surface 120a(1) at the inclined section S of one leg 120c of each hairpin wire 120 faces towards the outer side 110d of the iron core, and the surface 120a(2) at the inclined section S of the other leg 120d faces towards the inner side 110c of the iron core. In other words, for each hairpin wire 120, two surfaces 120a(1), 120a(2) at the inclined section S of a continuous surface on the two legs (120c, 120d) face towards two opposite directions in the radial direction 114 on the insertion side 110a, respectively. At the insertion side 110a of the iron core 110, the surface 130b(1) at the inclined section S of one leg 130c of each hairpin wire 130 faces towards the inner side 110c of the iron core, and the surface 130b(2) at the inclined section S of the other leg 130d faces towards the outer side 110d of the iron core. In other words, for each hairpin wire 130, two surfaces 130b(1), 130b(2) at the inclined section S of a continuous surface on two legs (130c, 130d) face towards two opposite directions in the radial direction 114 on the insertion side 110a, respectively.

Figure 8A:
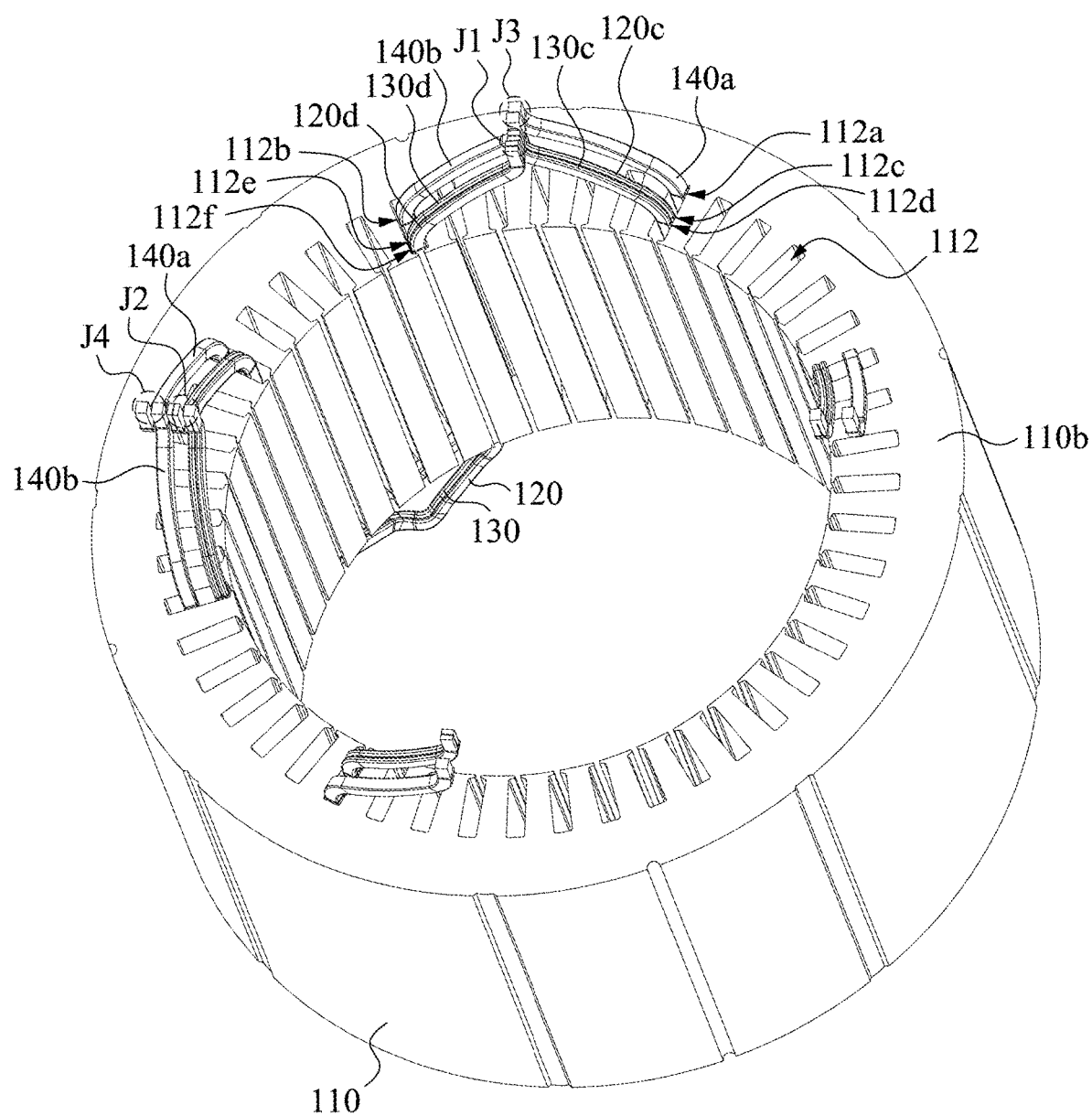
FIG. 8A illustrates a perspective view of the hairpin wires connected at the extension side to form a winding set according to an embodiment of the present disclosure.

Referring to FIG. 8A, which illustrates the hairpin wires connected at the extension side 110b to form a winding set. For clarity, this embodiment only shows a number of hairpin wires. As shown, each of the hairpin wires (120, 130) has its legs (120c, 130c) protruded from the third layer 112c and the fourth layer 112d of the slots 112 and connected to immediately adjacent legs (120d, 130d), i.e., legs of another hairpin wires (120, 130), that are protruded from the sixth layer 112f and the fifth layer 112e of the slots 112 at the ends (e.g., by welding) to form a first winding. In other words, the legs (120c, 130c, 120d, 130d) have their respective ends aligned to be immediately adjacent at some positions (for example, at position J1 or J2) such that all the hairpin wires 120, 130 are connected to form a winding (as shown in FIG. 2).

Figure 8B:
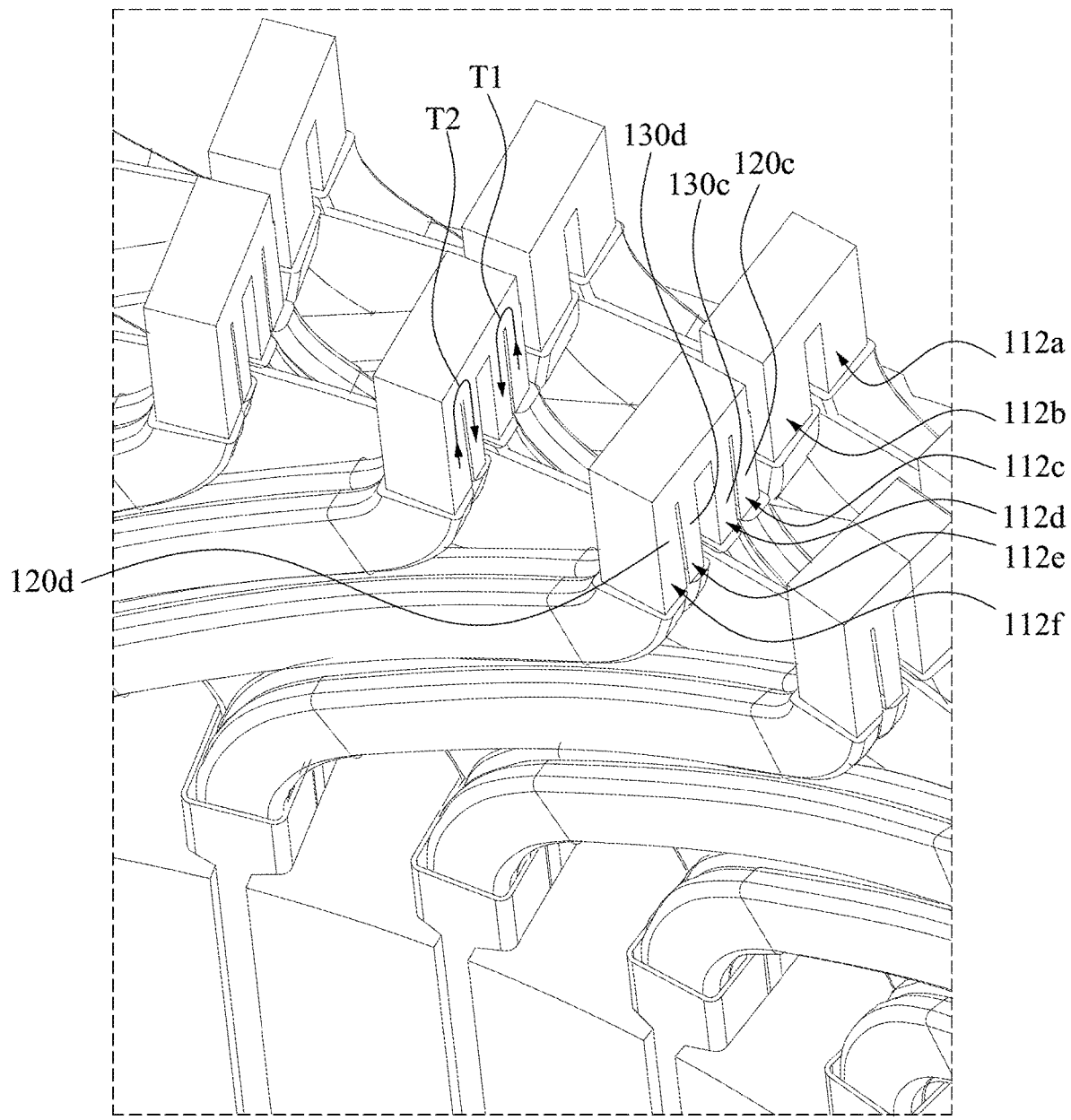
FIG. 8B illustrates a perspective view of the hairpin wires connected at the extension side and showing magnetic field eddy current.

Referring to FIG. 8B, the two legs (120c, 120d) of the hairpin wire 120 are inserted into the third layer 112c and the sixth layer 112f of the slots 112, and the two legs (130c, 130d) of the hairpin wire 130 are inserted into the fourth layer 112d and the fifth layer 112e of the slots 112. The direction T1 of the magnetic field eddy formed at the junction (e.g., the welded point) of the two legs (120c, 130c) is opposite to the direction T2 of the magnetic field eddy formed at the junction (e.g., the welded point) of the two legs (120d, 130d), thereby canceling the eddy current of the magnetic field and reducing the eddy current loss.

Referring back to FIG. 8A, a leg 140a of each hairpin wire 140 is protruded out of the first layer 112a of the slots 112, and is connected to an immediately-adjacent leg (i.e., a leg 140b of another hairpin wire 140) that is protruded out of the second layer 112b of the slots 112 (e.g., connected at position J3 or J4) to form a second winding.

Figure 9:
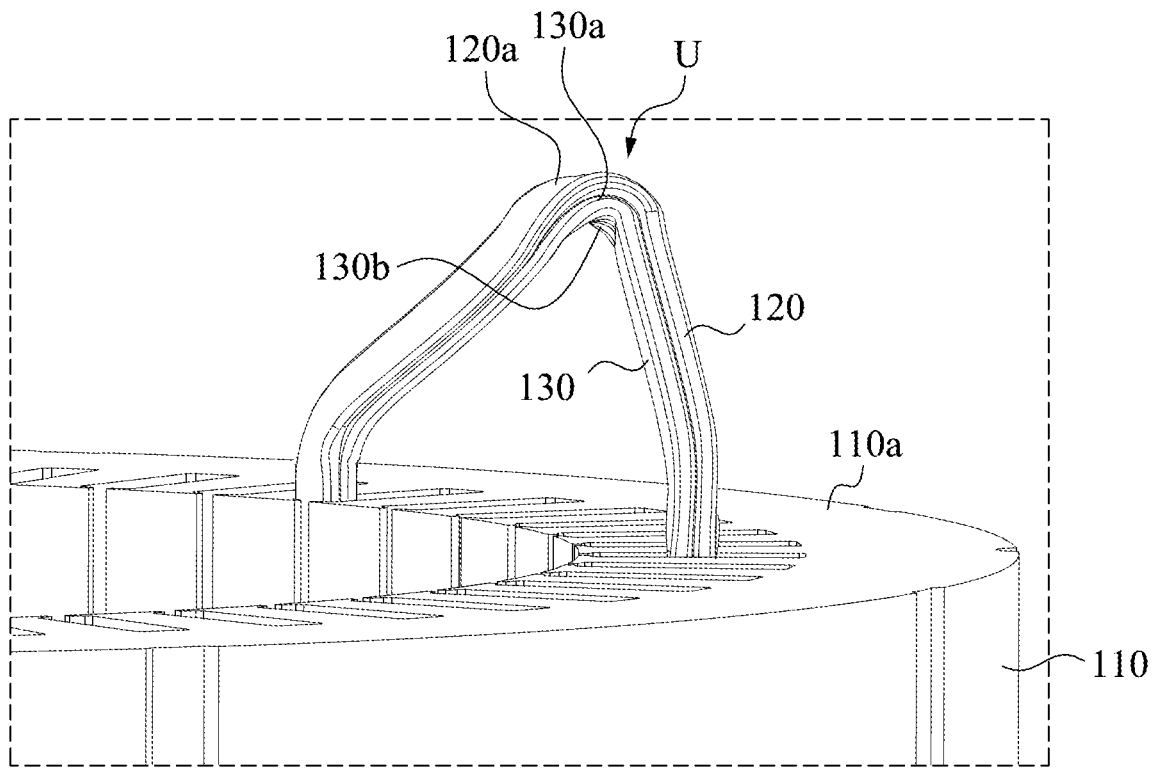
FIG. 9 illustrates a perspective view of the hairpin wire in FIG. 7 from a different viewpoint.

Referring to FIG. 9, since the hairpin wire 120 is imposed to the outer side of the hairpin wire 130, at the U-turn section U, the surface 120a of the hairpin wire 120 is farther from a top surface of the insertion side 110a of the iron core 110 than the surface 130a of the hairpin wire 130.

Figure 10:
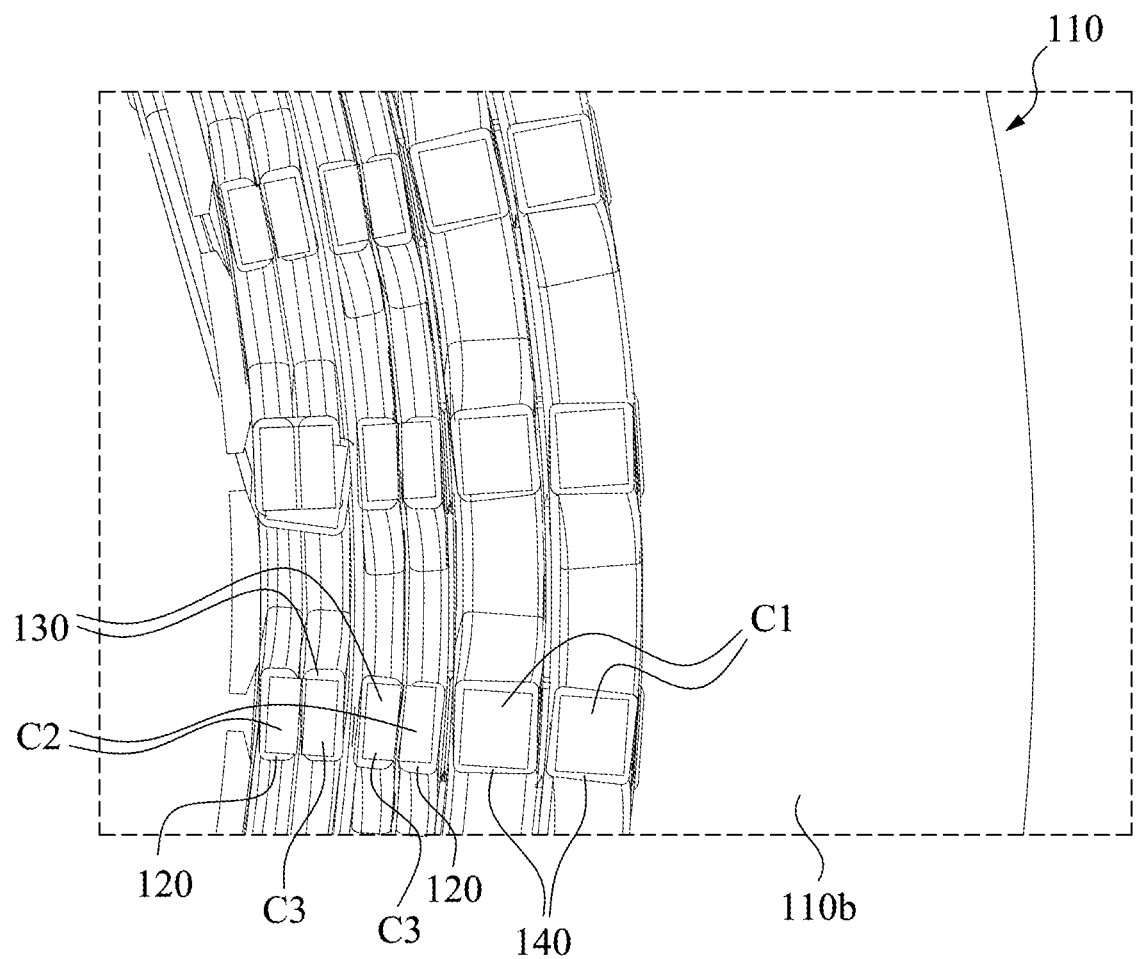
FIG. 10 illustrates an enlarged view of a motor stator from an extension side viewpoint according to an embodiment of the present disclosure.

Referring to FIG. 10, in one embodiment, a cross-sectional area C2 of each hairpin wire 120 is substantially equal to a cross-sectional area C3 of each hairpin wire 130. In another embodiment, a cross-sectional area sum (C2+C3) of each hairpin wire 120 and each hairpin wire 130 is less than or substantially equal to a cross-sectional area C1 of each hairpin wire 140. In yet another embodiment, the cross-sectional area C1 of each hairpin wire 140 is greater than the cross-sectional area C2 of each hairpin wire 120, or the cross-sectional area C1 of each hairpin wire 140 is greater than the cross-sectional area C3 of each hairpin wires 130. However, this disclosure does not limit the relationship between the cross-sectional areas of various wires.

Figure 11:
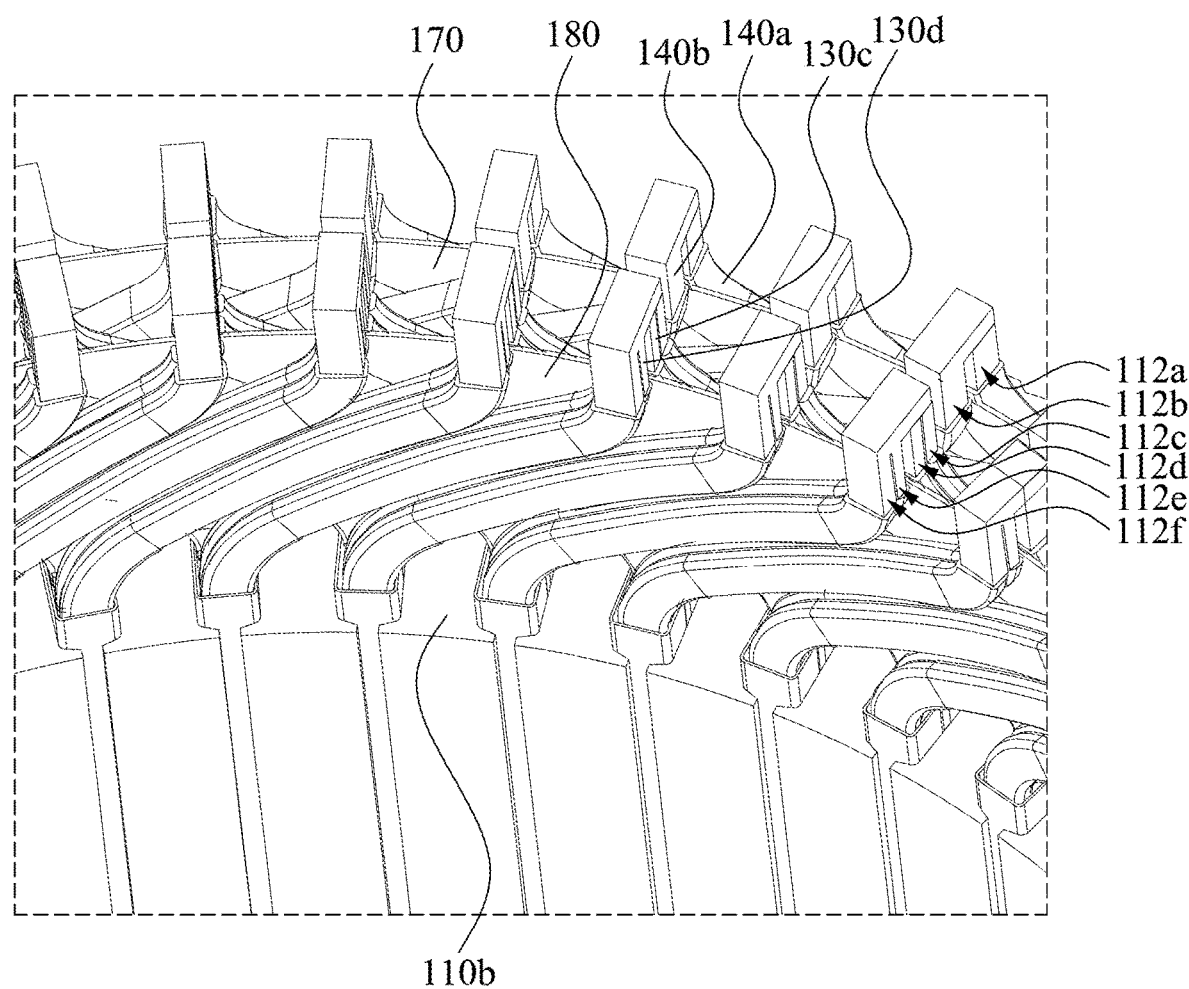
FIG. 11 illustrates an enlarged view of a motor stator from another extension side viewpoint according to an embodiment of the present disclosure.

Reference is made to FIG. 11, in one embodiment, the motor stator structure includes an insulation sheet 170 between the first layer 112a and the second layer 112b of the slots. That is, the insulation sheet 170 is positioned between immediately-adjacent legs (140a, 140b) of the hairpin wires 140 protruding out of the extension side 110b of the iron core 110. In another embodiment, the motor stator structure includes an insulation sheet 180 between the fourth layer 112d and the fifth layer 112e of the slots, that is, the insulation sheet 180 is located between the immediately adjacent legs (130c, 130d) of the hairpin wires 130 protruding out of the extension side 110b of the iron core 110. An insulation sheet may improve the insulation between adjacent wires by providing a physical barrier between the wires. In other embodiments, the motor stator structure may not be provided with the aforementioned insulation sheet 170 or insulation sheet 180, or may be provided with both the insulation sheet 170 and the insulation sheet 180, or provided with either one of the insulation sheet 170 and the insulation sheet 180.

Figure 12:
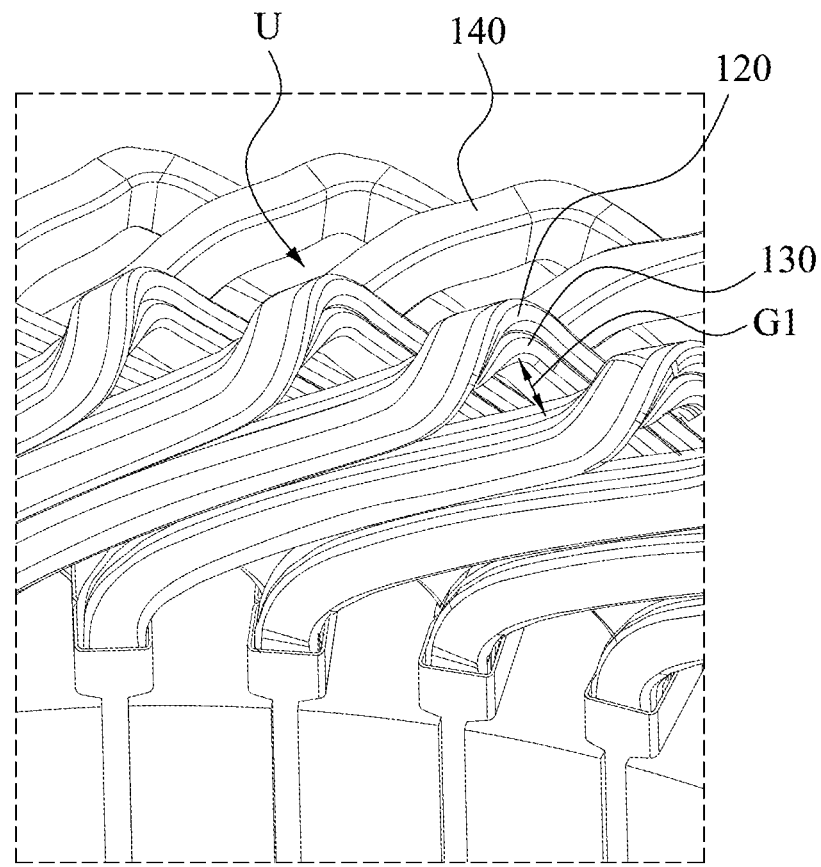
FIG. 12 illustrates an enlarged view of a motor stator from an insertion side viewpoint according to an embodiment of the present disclosure.
Figure 13:
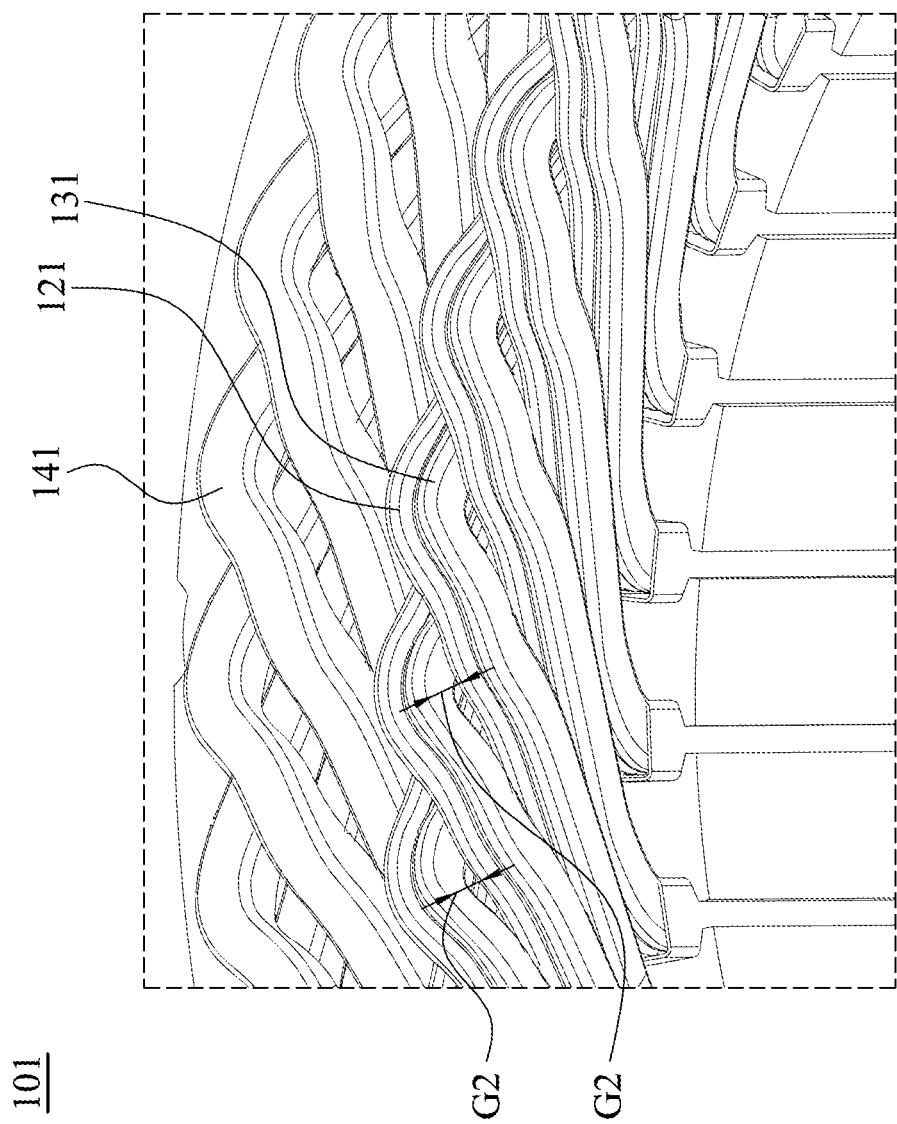
FIG. 13 illustrates an enlarged view of a motor stator from an insertion side viewpoint according to another embodiment of the present disclosure.

Reference is made to FIGS. 12 and 13. The manner by which the hairpin wires (120, 130, 140) of the motor stator 100 may be inserted into the slots of the iron core illustrated in FIG. 12 is previously described in reference to FIGS. 1-11. The motor stator 101 illustrated in FIG. 13 is different from the motor stator 100 mainly in the manner by which the hairpin wires (121, 131) are inserted into the slots of the iron core, and the hairpin wires (121, 131) are also imposed on each other. One leg of each hairpin wire 121 is inserted into the third layer 112c of the slots 112 of the iron core, and the other leg is inserted into the fifth layer 112e of the slots 112 of the iron core. One leg of each hairpin wire 131 is inserted into the fourth layer 112d of the slots 112 of the iron core and the other leg is inserted into the sixth layer 112f of the slots 112 of the iron core. The hairpin wires 141 are similar to the hairpin wires 140 discussed in previously described embodiments, and their legs are respectively inserted into the first layer 112a and the second layer 112b of the slots 112. Similarly, the hairpin wires 141 are connected to each other to form a first winding, and the hairpin wires 121 and the hairpin wires 131 are connected to each other to form a second winding. The hairpin wires (121, 131) of the motor stator 101 are inserted into the slots of the iron core in a manner different from the hairpin wires (120, 130) of the previously described embodiments of the motor stator 100, and the hairpin wires (121, 131) at its U-turn section U has a more obtuse U-turn than the U-turn section U of the hairpin wires (120,130) of the previously described embodiments. The U-turn section U of the hairpin wires (120, 130) of the previously described embodiments, having a sharper U-turn, provides a larger minimum wire spacing G1 of the hairpin wires (120, 130) than a minimum wire spacing G2 of the hairpin wires (121, 131). Accordingly, a larger wire spacing between the wires may improve overall insulation reliability of the motor stator 100.

Figure 14:
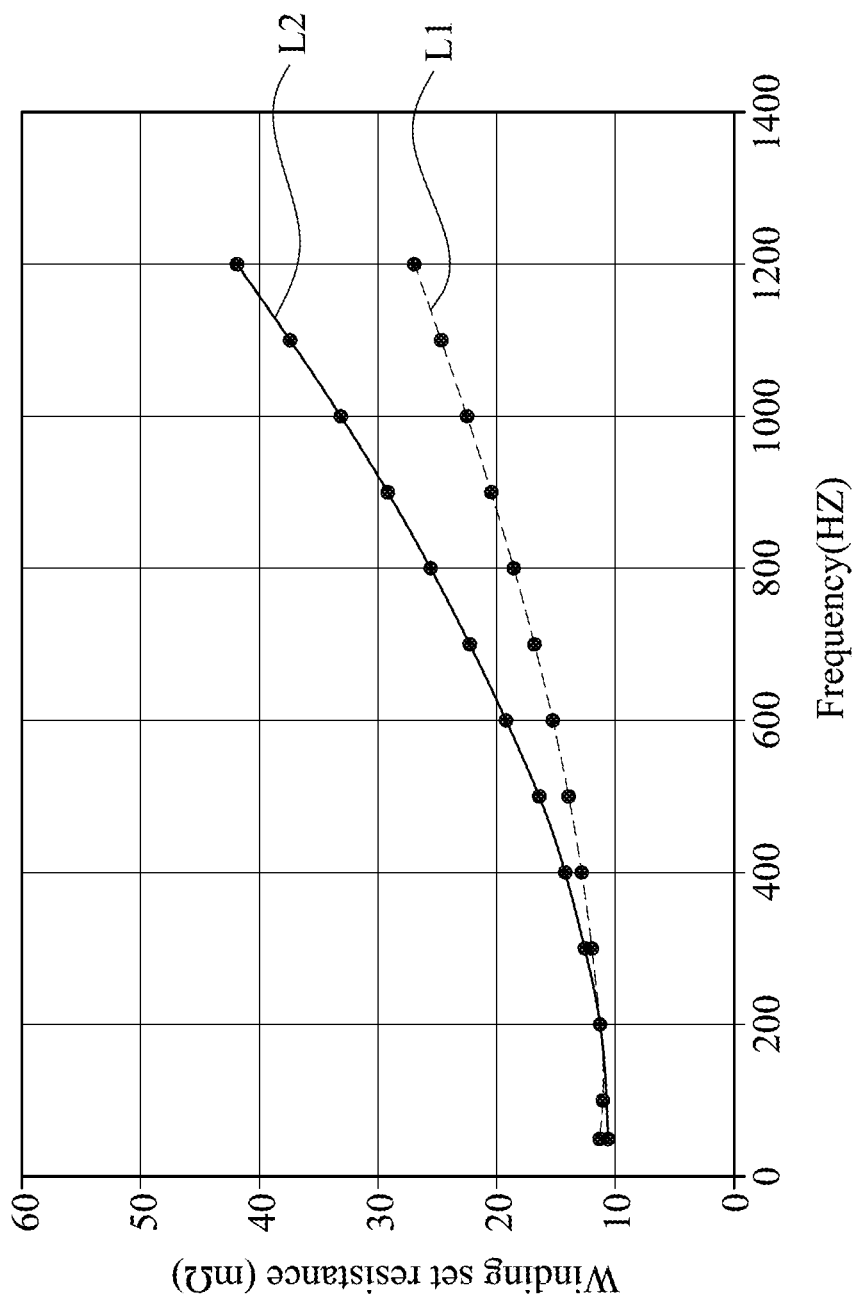
FIG. 14 illustrates an impedance comparison diagram of two operating motor stators according to two embodiments of the present disclosure.

Referring to FIG. 14, which illustrates an impedance comparison diagram of two operating motor stators (100, 102). Attention is directed to the curve L1 showing a change in the impedance value of the motor stator 100 operating between frequencies of 400 Hz to 1200 Hz and the curve L2 showing a change in the impedance value of the motor stator 101 operating between frequencies of 400 Hz to 1200 Hz. Comparing the curves L1 and L2, it can be seen that the impedance value of the motor stator 100 at higher frequency is notably lower than the impedance value of the motor stator 101 at the comparable higher frequency. That is, it indicates that an operating loss of the motor stator 100 at higher frequency is lower than that of the motor stator 101. With the design of the motor stator 100, the hairpin wires connected at the extension side are configured to better offset magnetic field eddy current (as shown in FIG. 8B) such that the equivalent impedance value can be more effectively reduced, thereby reducing an operation loss for the motor.

It will be apparent to those skilled in the art that various modifications and variations can be made to the structure of the present invention. It is intended that the present invention cover modifications and variations provided within the scope of the following claims.

What is claimed is:

1. A motor stator comprising:
   a core comprising a plurality of slots, an insertion side and an extension side opposite to the insertion side, wherein each slot comprises a first layer, a second layer, a third layer, a fourth layer, a fifth layer and a sixth layer, configured from outer to inner in a radial direction of the core;
   a plurality of first hairpin wires, each first hairpin wire comprising a first hairpin first leg and a first hairpin second leg, wherein each first hairpin first leg is inserted into the third layer of the slots from the insertion side and protruded out of the slots from the extension side and bent in a first direction, wherein each first hairpin second leg is inserted into the sixth layer of the slots from the insertion side and protruded out of the slots from the extension side and bent in a second direction;
   a plurality of second hairpin wires, each second hairpin wire comprising a second hairpin first leg and a second hairpin second leg, wherein each second hairpin first leg is inserted into the fourth layer of the slots from the insertion side and protruded out of the slots from the extension side and bent in a third direction, wherein each second hairpin second leg is inserted into the fifth layer of the slots from the insertion side and protruded out of the slots from the extension side and bent in a fourth direction; and
   a plurality of third hairpin wires, each third hairpin wire comprising a third hairpin first leg and a third hairpin second leg, wherein each third hairpin first leg is inserted into the first layer of the slots and each third hairpin second leg is inserted into the second layer of the slots,
   wherein an end of each first hairpin first leg is in physical contact with an end of a corresponding immediately-adjacent first hairpin second leg, an end of a corresponding immediately-adjacent second hairpin first leg and an end of a corresponding immediately-adjacent second hairpin second leg to form a first winding set.

2. The motor stator of claim 1, wherein the first direction and the third direction are of the same circumferential direction, the second direction and the fourth direction are of the same circumferential direction, and the first direction is opposite to the second direction.

3. The motor stator of claim 1, wherein each first hairpin wire comprises a first hairpin U-turn section and the first hairpin first leg and the first hairpin second leg extends from the first hairpin U-turn section, wherein each second hairpin wire comprises a second hairpin U-turn section and the second hairpin first leg and the second hairpin second leg extends from the second hairpin U-turn section, wherein the first hairpin U-turn section and the second hairpin U-turn section are located at the insertion side of the core, and wherein a turning angle of the first hairpin U-turn section is greater a turning angle of the second hairpin U-turn section.

4. The motor stator of claim 1, wherein each first hairpin wire comprises a first hairpin first surface and a first hairpin second surface opposite the first hairpin first surface, and each second hairpin wire comprises a second hairpin first surface and a second hairpin second surface opposite the second hairpin first surface, and wherein the first hairpin second surface imposes on the second hairpin first surface.

5. The motor stator of claim 4, wherein each first hairpin wire and each second hairpin wire comprises a U-turn section at the insertion side of the core, and wherein at the U-turn section the first hairpin first surface is farther from a surface of the insertion side of the core than the second hairpin first surface.

6. The motor stator of claim 4, wherein each first hairpin wire comprises a first leg inclined section and a second leg inclined section located at the insertion side of the core, and wherein the first hairpin first surface at the first leg inclined section faces towards an outer side of the core, and wherein the first hairpin first surface at the second leg inclined section faces towards an inner side of the core.

7. The motor stator of claim 4, wherein each second hairpin wire comprises a first leg inclined section and a second leg inclined section located at the insertion side of the core, and wherein the second hairpin second surface at the first leg inclined section faces towards an inner side of the core, and the second hairpin second surface at the second hairpin second leg faces towards an outer side of the core.

8. The motor stator of claim 1, wherein each first, second, third hairpin wire comprises a cross-sectional area, and wherein the third hairpin wire's cross-sectional area is greater than the first hairpin wire's cross-sectional area or the second hairpin wire's cross-sectional area.

9. The motor stator of claim 1 further comprising an insulation sheet disposed between the third hairpin first leg and the third hairpin second leg that protrude, at the extension side, out of the first layer and second layer of the slots respectively.

10. The motor stator of claim 1, wherein each third hairpin first leg is connected with the immediately-adjacent third hairpin second leg to form a second winding set.

11. The motor stator of claim 1 further comprising an insulation sheet disposed between the second hairpin first leg and the second hairpin second leg that protrude, at the extension side, out of the fourth layer and fifth layer of the slots respectively.

12. The motor stator of claim 1, wherein the first hairpin first leg that protrudes out of the slots at the extension side and bends in the first direction, is configured to extend over a first span distance; wherein the first hairpin second leg that protrudes out of the slots at the extension side and bends in the second direction, is configured to extend over a second span distance; and wherein the first span distance is substantially equal to the second span distance.

13. The motor stator of claim 1, wherein each first hairpin wire comprises a total length greater than a total length of each second hairpin wire.

14. The motor stator of claim 1, wherein each first and second hairpin wire comprises a cross-sectional area, and wherein the first hairpin wire's cross-sectional area is substantially equal to the second hairpin wire's cross-sectional area.

15. The motor stator of claim 1, wherein each first, second, third hairpin wire comprises a cross-sectional area, and wherein a sum of the first hairpin wire's cross-sectional area and the second hairpin wire's cross-sectional area is substantially equal to or less than the third hairpin wire's cross-sectional area.

16. A motor stator comprising:
a core comprising a plurality of slots, an insertion side and an extension side opposite to the insertion side, wherein each slot comprises a first layer, a second layer, a third layer, a fourth layer, a fifth layer and a sixth layer, configured from outer to inner in a radial direction of the core;
a plurality of first hairpin wires, each first hairpin wire comprising a first hairpin first leg and a first hairpin second leg, wherein each first hairpin first leg is inserted into the third layer of the slots, wherein each first hairpin second leg is inserted into the sixth layer of the slots; and
a plurality of second hairpin wires, each second hairpin wire comprising a second hairpin first leg and a second hairpin second leg, wherein each second hairpin first leg is inserted into the fourth layer of the slots, wherein each second hairpin second leg is inserted into the fifth layer of the slots; and
a plurality of third hairpin wires, each third hairpin wire comprising a third hairpin first leg and a third hairpin second leg, wherein each third hairpin first leg is inserted into the first layer of the slots and each third hairpin second leg is inserted into the second layer of the slots,
wherein at the extension side, a plurality of immediately-adjacent hairpin legs are connected such that an end of the first hairpin first leg, an end of the first hairpin second leg, an end of the second hairpin first leg and an end of the second hairpin second leg are in physical contact with one another to form a first winding set, and the third hairpin first leg and the third hairpin second leg are connected to form a second winding set.

17. The motor stator of claim 16, wherein each first hairpin wire comprises a first hairpin first surface and a first hairpin second surface opposite the first hairpin first surface, wherein each first hairpin wire further comprises a first leg inclined section and a second leg inclined section located at the insertion side of the core, and wherein the first hairpin first surface at the first leg inclined section and the second inclined section face towards opposite directions in the radial direction of the core.

18. The motor stator of claim 17, wherein each second hairpin wire comprises a second hairpin first surface and a second hairpin second surface opposite the second hairpin first surface, wherein each second hairpin wire further comprises a first leg inclined section and a second leg inclined section located at the insertion side of the core, and wherein the second hairpin first surface at the second hairpin's first leg inclined section and the second hairpin's second inclined section face towards opposite directions in the radial direction of the core, and wherein the first hairpin second surface is in contact with the second hairpin first surface.

19. The motor stator of claim 16 further comprising a first insulation sheet disposed between the second hairpin first leg and the second hairpin second leg that protrude, at the extension side, out the fourth layer and fifth layer of the slots respectively, and/or a second insulation sheet disposed between the third hairpin first leg and the third hairpin second leg that protrude, at the extension side, out the first layer and second layer of the slots respectively.

20. The motor stator of claim 16, wherein each first, second, third hairpin wire comprises a cross-sectional area, and wherein the first hairpin wire's cross-sectional area is substantially equal to the second hairpin wire's cross-sectional area, and/or a sum of the first hairpin wire's cross-sectional area and the second hairpin wire's cross-sectional area is substantially equal to or less than the third hairpin wire's cross-sectional area.

* * * * *